(12) United States Patent
Vajravel et al.

(10) Patent No.: US 12,108,317 B2
(45) Date of Patent: Oct. 1, 2024

(54) SEAMLESS PAIRING OF WIRELESS DEVICES IN HOTELING ENVIRONMENTS

(71) Applicant: Dell Products, L.P., Round Rock, TX (US)

(72) Inventors: Gokul Thiruchengode Vajravel, Bangalore (IN); Vivek Viswanathan Iyer, Austin, TX (US)

(73) Assignee: Dell Products, L.P., Round Rock, TX (US)

( * ) Notice: Subject to any disclaimer, the term of this patent is extended or adjusted under 35 U.S.C. 154(b) by 467 days.

(21) Appl. No.: 17/590,921

(22) Filed: Feb. 2, 2022

(65) Prior Publication Data

US 2023/0247404 A1 Aug. 3, 2023

(51) Int. Cl.
*H04W 4/80* (2018.01)
*G06F 1/16* (2006.01)
*H04W 8/00* (2009.01)

(52) U.S. Cl.
CPC ............ *H04W 4/80* (2018.02); *G06F 1/1632* (2013.01); *H04W 8/005* (2013.01)

(58) Field of Classification Search
CPC ........ H04W 4/80; H04W 8/005; G06F 1/1632
See application file for complete search history.

(56) References Cited

U.S. PATENT DOCUMENTS

| | | | |
|---|---|---|---|
| 10,855,664 B1* | 12/2020 | Ziraknejad | H04W 4/02 |
| 2016/0360341 A1* | 12/2016 | Srivatsa | H04W 76/14 |
| 2017/0231022 A1* | 8/2017 | Ito | H04W 76/10 |
| 2020/0008057 A1* | 1/2020 | Zhao | H04L 9/0869 |
| 2023/0086381 A1* | 3/2023 | Narula | H04W 52/0203 455/572 |
| 2024/0007825 A1* | 1/2024 | Vajravel | H04W 4/029 |

* cited by examiner

*Primary Examiner* — Melvin C Marcelo
(74) *Attorney, Agent, or Firm* — Fogarty LLP (57) ABSTRACT

Systems and methods for seamless pairing of wireless devices in hoteling environments are described. In an embodiment, an Information Handling System (IHS), may include a processor and a memory coupled to the processor, the memory having program instructions stored thereon that, upon execution, cause the IHS to: in response to a temporary reservation of one of a plurality of workspaces, receive data associated with a peripheral device located in the workspace; pre-pair the peripheral device to the IHS based upon the data in anticipation of the IHS having reached the workspace; and in response to a determination that the IHS has reached the workspace, complete a pairing of the peripheral device to the IHS.

20 Claims, 3 Drawing Sheets

SEAMLESS PAIRING OF WIRELESS DEVICES IN HOTELING ENVIRONMENTS

FIELD

This disclosure relates generally to Information Handling Systems (IHSs), and, more specifically, to systems and methods for seamless pairing of wireless devices in hoteling environments.

BACKGROUND

As the value and use of information continues to increase, individuals and businesses seek additional ways to process and store it. One option available to users is an Information Handling System (IHS). An IHS generally processes, compiles, stores, and/or communicates information or data for business, personal, or other purposes thereby allowing users to take advantage of the value of the information. Because technology and information handling needs and requirements vary between different users or applications, IHSs may also vary regarding what information is handled, how the information is handled, how much information is processed, stored, or communicated, and how quickly and efficiently the information may be processed, stored, or communicated.

Variations in IHSs allow for IHSs to be general or configured for a specific user or specific use such as financial transaction processing, airline reservations, enterprise data storage, or global communications. In addition, IHSs may include a variety of hardware and software components that may be configured to process, store, and communicate information and may include one or more computer systems, data storage systems, and networking systems.

In modern enterprises, the term "hoteling" (or "office hoteling") refers to a practice where workers dynamically schedule their hourly, daily, or weekly use of office desks, cubicles, or rooms (e.g., a conference room), thus serving as an alternative to permanently assigned seating. Generally, employees access a reservation system to book a workspace before they arrive at work, which gives them freedom and flexibility to work where they want to.

SUMMARY

Systems and methods for seamless pairing of wireless devices in hoteling environments are described. In an illustrative, non-limiting embodiment, an Information Handling System (IHS), may include a processor and a memory coupled to the processor, the memory having program instructions stored thereon that, upon execution, cause the IHS to: in response to a temporary reservation of one of a plurality of workspaces, receive data associated with a peripheral device located in the workspace; pre-pair the peripheral device to the IHS based upon the data in anticipation of the IHS having reached the workspace; and in response to a determination that the IHS has reached the workspace, complete a pairing of the peripheral device to the IHS.

The data may include at least one of: a device identifier, a pairing key, or a certificate. The peripheral device may include at least one of: a display, a headset, a keyboard, a mouse, a webcam, or a printer. The data associated with the peripheral device may be received from a hoteling database comprising a reservation table and a peripheral table for the plurality of workspaces.

To pre-pair the peripheral device, the program instructions, upon execution, may cause the IHS to abstain from flashing at least a portion of the data to a Non-Volatile Random-Access Memory (NVRAM). To complete the pairing, the program instructions, upon execution, may cause the IHS to flash the portion of the data to the NVRAM.

The determination may be made by an Embedded Controller (EC) controller coupled to the processor while the IHS is in a low-power mode of operation. Additionally, or alternatively, the determination may be based, at least in part, upon at least one of: a Received Signal Strength Indicator (RSSI), a geolocation, a network address, a Quick Response (QR) code, or a Radio-Frequency Identification (RFID) tag.

The program instructions, upon execution, may cause the IHS to determine that the IHS has reached the workspace, at least in part, in response to a communication from a workspace management device. The peripheral device may be selected among a plurality of peripheral devices located in the workspace based, at least in part, upon context information.

The context information may include at least one of: a class of the IHS, a service tag of the IHS, or an identity of a user of the IHS. Additionally, or alternatively, the context information may include a type of container executed by the client IHS. Additionally, or alternatively, the context information may include a posture of the IHS.

The program instructions, upon execution, may cause the IHS to: in response to the temporary reservation, receive an Access Point (AP) profile associated with an AP configured to serve the workspace; and in response to the determination, connect to the AP based upon the AP profile.

In another illustrative, non-limiting embodiment, a memory storage device may have program instructions stored thereon that, upon execution by an IHS, cause IHS to: identify pairing data associated with a peripheral device located in one of a plurality of workspaces scheduled for hoteling by a user; and transmit the pairing data to a client device operated by the user, where the client device is at a location exclusive of the scheduled workspace, and where the client device is configured to: pre-pair the peripheral device based upon the pairing data and, in response to a determination that the client device has reached the scheduled workspace, complete a pairing of the peripheral device.

The pairing data may include at least one of: a device identifier, a pairing key, or a certificate, and where the peripheral device comprises at least one of: a display, a headset, a keyboard, a mouse, a webcam, or a printer. The program instructions, upon execution, may cause the IHS to transmit, to the client device, an AP profile associated with an AP configured to serve the scheduled workspace, and where the client device is configured to connect to the AP based upon the AP profile.

In yet another illustrative, non-limiting embodiment, a method may include: scheduling use of a workspace by a client, where the workspace comprises an IHS; and transmitting, to the IHS, data associated with a device kept by the client, where the IHS is configured to: (a) pre-pair the device based upon the data in anticipation of the client arriving at the workspace; and (b) complete a pairing of the device in response to the client arriving at the workspace.

The pairing data may include at least one of: a device identifier, a pairing key, or a certificate. The device may include at least one of: a display, a headset, a keyboard, a mouse, a webcam, or a printer.

BRIEF DESCRIPTION OF THE DRAWINGS

The present invention(s) is/are illustrated by way of example and is/are not limited by the accompanying figures, in which like references indicate similar elements. Elements in the figures are illustrated for simplicity and clarity and have not necessarily been drawn to scale.

DETAILED DESCRIPTION

For purposes of this disclosure, an Information Handling System (IHS) may include any instrumentality or aggregate of instrumentalities operable to compute, calculate, determine, classify, process, transmit, receive, retrieve, originate, switch, store, display, communicate, manifest, detect, record, reproduce, handle, or utilize any form of information, intelligence, or data for business, scientific, control, or other purposes. For example, an IHS may be a personal computer (e.g., desktop or laptop), tablet computer, mobile device (e.g., Personal Digital Assistant (PDA) or smart phone), server (e.g., blade server or rack server), a network storage device, or any other suitable device and may vary in size, shape, performance, functionality, and price. An example of an IHS is described in more detail below.

Figure 1:
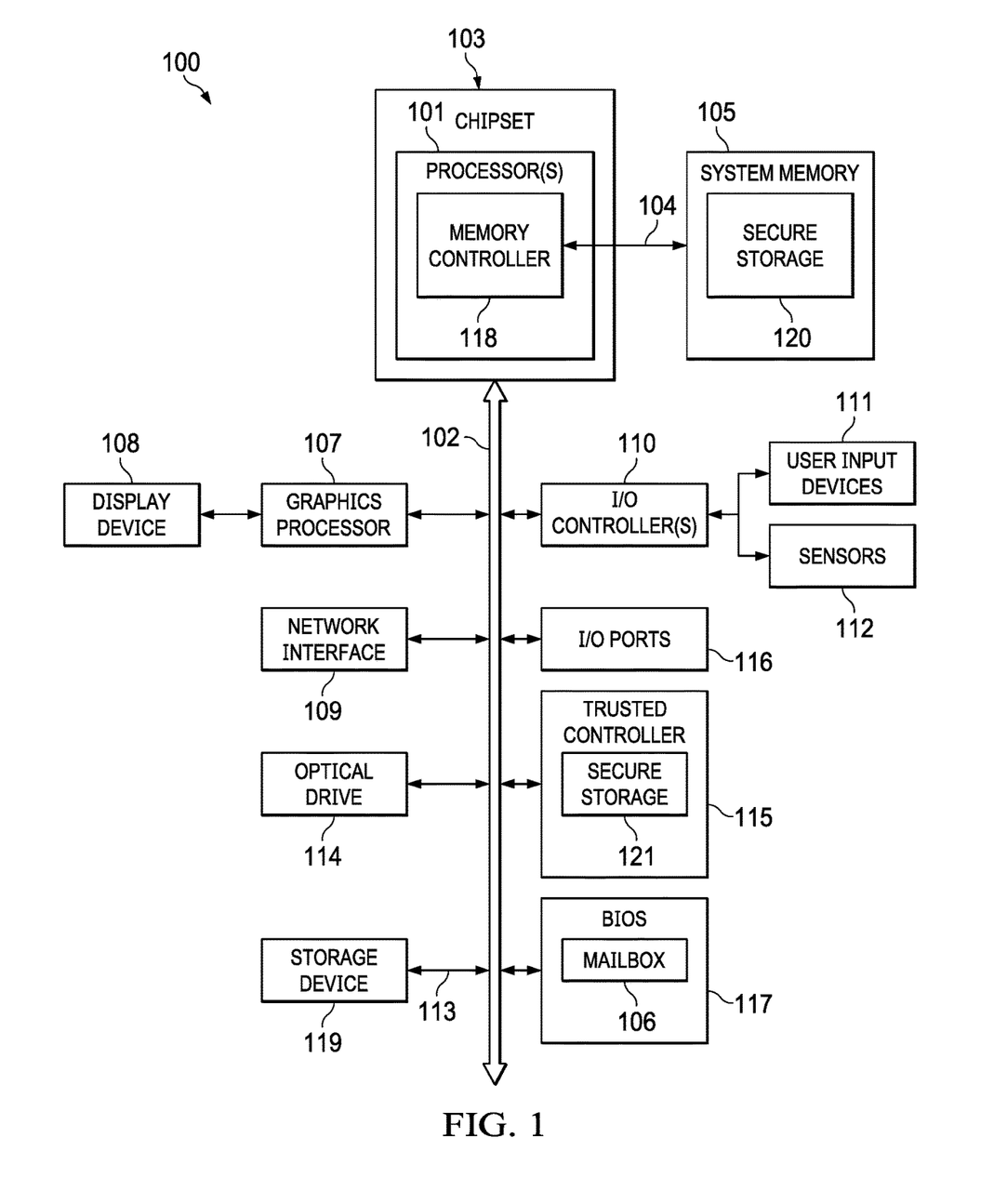
FIG. 1 is a diagram depicting examples of components of an Information Handling System (IHS), according to some embodiments.

FIG. 1 shows various internal components of an IHS configured to implement certain of the described embodiments. It should be appreciated that although certain embodiments described herein may be discussed in the context of a personal computing device, other embodiments may utilize various other types of IHSs.

Processor(s) 101 may include any processor capable of executing program instructions, such as an INTEL PENTIUM series processor or any general-purpose or embedded processors implementing any of a variety of Instruction Set Architectures (ISAs), such as the x86, POWERPC®, ARM®, SPARC®, or MIPS® ISAs, or any other suitable ISA. In the embodiment of FIG. 1, processor(s) 101 include an integrated memory controller 118 that may be implemented directly within the circuitry of processor(s) 101, or memory controller 118 may be a separate integrated circuit that is located on the same die as processor(s) 101. Memory controller 118 may be configured to manage the transfer of data to and from system memory 105 of IHS 100 via high-speed memory interface 104.

System memory 105 coupled to processor(s) 101 via memory bus 104 provides processor(s) 101 with a high-speed memory that may be used in the execution of computer program instructions by processor(s) 101. Accordingly, system memory 105 may include memory components, such as such as static RAM (SRAM), dynamic RAM (DRAM), NAND Flash memory, suitable for supporting high-speed memory operations. In some embodiments, system memory 105 may combine both persistent, non-volatile memory and volatile memory.

In certain embodiments, system memory 105 includes secure storage 120 that may be a portion of the system memory designated for storage of information, such as access policies, component signatures, encryption keys, and other cryptographic information, etc. In such embodiments, a signature may be calculated based on contents of secure storage 120 and stored as a reference signature. The integrity of the data stored in secure storage 120 may then be validated later by recalculating this signature of the contents of the secure storage and comparing the recalculated signature against the reference signature.

IHS 100 utilizes chipset 103 that may include one or more integrated circuits coupled to processor(s) 101. In the embodiment of FIG. 1, processor(s) 101 are depicted as component(s) of chipset 103. In other embodiments, all of chipset 103, or portions of chipset 108, may be implemented directly within the integrated circuitry of processor(s) 101. Chipset 103 provides processor(s) 101 with access to a variety of resources accessible via bus 102. In IHS 100, bus 102 is illustrated as a single element. However, other implementations may utilize any number of buses to provide the illustrated pathways served by bus 102.

As illustrated, a variety of resources may be coupled to processor(s) 101 of IHS 100 through chipset 103. For instance, chipset 103 may be coupled to network interface 109, such as provided by a Network Interface Controller (NIC) that allows IHS 100 to communicate via a network, such as the Internet or a LAN. Network interface device 109 may provide IHS 100 with wired and/or wireless network connections via a variety of network technologies, such as wireless cellular or mobile networks (CDMA, TDMA, LTE etc.), WiFi, and/or BLUETOOTH. In certain embodiments, network interface 109 may support connections between a trusted IHS component, such as Embedded Controller (EC) 115, and one or more remote service(s). In such embodiments, a connection supported by network interface 109 between the remote service(s) and EC 115 may be considered an out-of-band (OOB) connection that is isolated from any Operating System (OS) of IHS 100.

Chipset 102 may also provide access to one or more display device(s) 108 via graphics processor 107. In certain embodiments, graphics processor 107 may be part of one or more video or graphics cards/controllers, installed as components of IHS 100. Graphics processor 107 may generate display information and provide the generated information to one or more display device(s) 108 coupled to IHS 100. Display device(s) 108 may include integrated display devices and/or external display devices coupled to IHS, such as via I/O port 116. In certain embodiments, graphics processor 107 may be integrated within processor(s) 101.

One or more display devices 108 coupled to IHS 100 may utilize Liquid Crystal Display (LCD), Light Emitting Diode (LED), organic LED (OLED), or other thin film display technologies. Each display device 108 may be capable of touch input such as via a touch controller which may be an embedded component of display device 108, graphics processor 107, or a separate component of IHS 100 accessed via bus 102.

In certain embodiments, chipset 103 may utilize one or more I/O controllers to access hardware components such as user input devices 111 and sensors 112. For instance, I/O controller 110 may provide access to user-input devices 110 such as a keyboard, mouse, touchpad, touchscreen and/or other peripheral input devices. User input devices 111 may interface with I/O controller 110 through wired or wireless connections. Sensors 112 accessed via I/O controllers 110 may provide access to data describing environmental and operating conditions of IHS 100 (e.g., accelerometers, gyroscopes, hinge sensors, rotation sensors, hall effect sensors, temperature sensors, voltage sensors, sensors, IR sensors, photosensors, proximity sensors, distance sensors, magnetic sensors, microphones, ultrasonic sensors, etc.).

In some cases, chipset 103 may include a sensor hub capable of utilizing information collected by sensors 112 in determining the relative orientation and movement of IHS 100. For instance, the sensor hub may receive data obtained by inertial movement sensors, including accelerometers, gyroscopes, and/or magnetometer sensors, and it may determine the orientation and movement of IHS 100 based, at least in part, on that data (e.g., IHS 100 is motionless on a relatively flat surface, IHS 100 is being moved irregularly and is likely in transport, the hinge of IHS 100 is oriented in a vertical direction).

In certain embodiments, the sensor hub may also include capabilities for determining a location and movement of IHS 100 based on triangulation of network signals and/or based on network information provided by the OS and/or network interface 109. In some embodiments, the sensor hub may support additional sensors, such as optical, infrared and sonar sensors, that may provide support for xR (virtual, augmented, and/or mixed reality) sessions hosted by IHS 100 and that may be used to provide an indication of a user's presence near IHS 100, such as whether a user is present, absent, and/or facing integrated display 108.

In cases where the end-user is present before IHS 100, the sensor hub may further determine a distance between the end-user and IHS 100, and such a determination may be made continuously, at periodic intervals, or upon request. These detected, calculated, or estimated distances may be used by processor(s) 101 to classify the user as being in IHS 100's near-field (user's position<threshold distance A), mid-field (threshold distance A<user's position<threshold distance B, where B>A), or far-field (user's position>threshold distance C, where C>B).

In embodiments where IHS 100 supports multiple physical configurations, such as a convertible laptop, N-in-1 device, or the like, the sensor hub may utilize one or more mode sensors 112 that collect readings usable to determine the posture in which IHS 100 is physically configured. In certain embodiments, posture determinations may be additionally made using movement and orientation information provided by sensors 112. In laptop and convertible laptop embodiments, for example, processor(s) 101 or EC 115 may utilize a lid position sensor 112 to determine the relative angle between the two panels of the laptop to determine the mode in which IHS 100 is physically configured. For example, the lid position sensor may measure the angle of rotation of the hinge that connects the base panel and lid panel of IHS 100. In some cases, processor(s) 101 or EC 115 may provide collected lid position information, such as the hinge angle, to the sensor hub for use in determining the posture in which IHS 100 is configured. Alternatively, the sensor hub may interface directly with the lid position sensor in determining hinge angle information.

The sensor hub may determine the posture of IHS 100 based, at least in part, on the angle of rotation of the hinge of IHS 100 from a closed position. A first range of hinge angles from a closed position may indicate a laptop posture, a second range of hinge angles may indicate a landscape posture and a third range of angles may indicate a tablet posture. The sensor hub may additionally utilize orientation and movement information collected from inertial movement sensors 112 to further identify the posture in which IHS 100 is physically configured.

For instance, if the sensor hub determines that IHS 100 is configured with a hinge angle characteristic of a laptop configuration, but IHS 100 is oriented on its side, IHS 100 may be determined to be in a book posture. Additionally, or alternatively, if IHS 100 is determined to be tilted such that the hinge is oriented between horizontal and vertical, the user's face is detected to be facing the integrated display, and IHS 100 is experiencing slight movement, the sensor hub may determine that IHS 100 is being used in the book posture.

The sensor hub may determine that IHS 100 is opened to a 180-degree hinge angle and lies on a flat surface, thus indicating that IHS 100 it is being used in a landscape posture. The sensor hub may similarly determine that IHS 100 is in a tent posture, in response to detecting a hinge angle within a defined range, such as between 300 and 345 degrees, and detecting an orientation of IHS 100 where the hinge is aligned horizontally and is higher than both display panels of IHS 100.

Other components of IHS 100 may include one or more I/O ports 116 for communicating with peripheral external devices as well as various input and output devices. For instance, I/O 116 ports may include HDMI (High-Definition Multimedia Interface) ports for use in connecting external display devices to IHS 100 and USB (Universal Serial Bus) ports, by which a variety of external devices may be coupled to IHS 100. In some embodiments, external devices coupled to IHS 100 via I/O port 116 may include storage devices that support transfer of data to and from system memory 105 and/or storage devices 119 of IHS 100. Access to storage devices via I/O port 116 may result in a change in a security profile of IHS 100.

Chipset 103 also provides processor(s) 101 with access to one or more storage devices 119. In various embodiments, storage device 119 may be integral to IHS 100, or may be external to IHS 100. In certain embodiments, storage device 119 may be accessed via a storage controller that may be an integrated component of the storage device. Storage device 119 may be implemented using any memory technology allowing IHS 100 to store and retrieve data. For instance, storage device 119 may be a magnetic hard disk storage drive or a solid-state storage drive. In some embodiments, storage device 119 may be a system of storage devices, such as a cloud drive accessible via network interface 109.

IHS 100 also includes BIOS (Basic Input/Output System) 117 that may be stored in a non-volatile memory accessible by chipset 103 via bus 102. Upon powering or restarting IHS 100, processor(s) 101 may utilize BIOS 117's instructions to initialize and test hardware components coupled to IHS 100. Upon execution, these instructions may facilitate the loading of an OS (e.g., WINDOWS, MACOS, iOS, ANDROID, LINUX, etc.) for use by IHS 100. BIOS 117 provides an abstraction layer that allows the OS to interface with hardware components of IHS 100. The Unified Extensible Firmware Interface (UEFI) was designed as a successor to BIOS. As a result, many IHS 100 may utilize UEFI in addition to or instead of a BIOS. As used herein, BIOS is intended to also encompass UEFI.

As illustrated, BIOS 117 may include a predefined memory or memory region that may be referred to as NVM (Non-Volatile Memory) mailbox 106. In such an implementation, mailbox 106 provides a secured storage location for use in storing access policies, signatures, cryptographic keys, or other data. For example, BIOS mailbox 106 may be utilized as a secure storage utilized by a remote service (e.g., remote services 220 of FIG. 2) to store configurations, access policies, and/or cryptographic keys for use in delivering and deploying its services to IHS 100. BIOS mailbox 106 and secured storage 120 in system memory 105 may be utilized in this manner instead of, or in conjunction with, out-of-band functions implemented by EC 115.

EC 115 may be installed as a component of the motherboard of IHS 100. EC 115 may implement operations for interfacing with a power adapter in managing power for IHS 100. Such operations may be utilized to determine the power status of IHS 100, such as whether IHS 100 is operating from battery power or is plugged into an AC power source. Firmware instructions utilized by EC 115 may be used to operate a secure execution environment that may include operations for providing various core operations of IHS 100, such as power management and management of certain modes of IHS 100 (e.g., turbo modes, maximum operating clock frequencies of certain components, etc.).

IHS 100 may support the use of various power modes. In some embodiments, the power modes of IHS 100 may be implemented through operations of EC 115 and/or the OS of IHS 100. In various embodiments, IHS 100 may support different reduced power modes to reduce power consumption and/or conserve battery power when IHS 100 is not actively in use, and/or to control a level of performance available to the user by increasing or decreasing a maximum operating clock frequency of a component of IHS 100 (e.g., processor(s) 101).

For example, in some implementations, a low-power mode of operation may include the S0 low-power idle model, also known as Modern Standby or Connected Standby, which provides an instant on/off user experience and maintains a network connection for certain processes while consuming very little power. These power modes may be entered, for example, when IHS 100 transitions into standby (e.g., "sleep," etc.).

EC 115 may implement operations for detecting certain changes to the physical configuration of IHS 100 and managing the modes corresponding to different physical configurations of IHS 100. For instance, where IHS 100 is a laptop computer or a convertible laptop computer, EC 115 may receive inputs from a lid position sensor 112 that may detect whether the two sides of the laptop have been latched together to a closed position. In response to lid position sensor 112 detecting latching of the lid of IHS 100, EC 115 may initiate operations for shutting down IHS 100 or placing IHS 100 in a low-power mode.

EC 115 may be additionally configured to calculate signatures that uniquely identify individual components of IHS 100. In such scenarios, EC 115 may calculate a hash value based on the configuration of a hardware and/or software component coupled to IHS 100. For instance, EC 115 may calculate a hash value based on all firmware and other code or settings stored in an onboard memory of a hardware component, such as a network interface 109. Such hash values may be calculated as part of a trusted process of manufacturing IHS 100 and may be maintained in the secure storage 121 as a reference signature.

EC 115 may be further configured to recalculate a hash value later for such a component. The hash value recalculated for the component may then be compared against the reference hash value signature to determine if any modifications have been made to a component, thus indicating the component has been compromised. In this manner, EC 115 may be used to validate the integrity of hardware and software components installed on IHS 100.

In some cases, secure storage 121 may be utilized as a secure storage utilized by a remote service (e.g., remote services 220 of FIG. 2) to store configurations, access policies, and/or cryptographic keys for use in delivering and deploying its services to IHS 100.

In various embodiments, IHS 100 may not include all the components shown in FIG. 1. In other embodiments, IHS 100 may include other components in addition to those that are shown in FIG. 1. Furthermore, some components that are represented as separate components in FIG. 1 may instead be integrated with other components. For example, all or a portion of the operations executed by the illustrated components may instead be provided by components integrated into processor(s) 101 as systems-on-a-chip. As such, in certain embodiments, IHS 100 may be implemented as different classes of computing devices including, but not limited to: servers, workstations, desktops, laptops, appliances, video game consoles, tablets, smartphones, wearables (e.g., smart watches), etc.

As previously noted, the practice of hoteling typically involves having workspaces (e.g., desks, cubicles, conference rooms, offices, etc.) available for employees, workers, or users (hereinafter "hoteling clients" or "clients") to reserve or claim in advance, or throughout the workday, instead of traditional permanent seating. In some implementations, a workspace may include its own set of peripheral device(s) (e.g., keyboards, mice, touchscreens, touchpads, trackpads, trackballs, pens, tablets, joysticks, webcams, digital camcorders, scanners, biometric sensors, displays, projectors, TVs, printers, plotters, speakers, microphones, headsets, external hard drives, media card readers, digital mixers, MIDI equipment, etc.) available to clients at that location.

Additionally, or alternatively, a workspace may include an IHS available to clients, and each client may bring their own peripheral device(s) to work (e.g., a headset, etc.). Additionally, or alternatively, a workspace may be served by one of a plurality of distributed Access Points (APs) for network/Internet connectivity, such as wireless routers or the like.

In various embodiments, when a client arrives at a workspace, their IHS may be coupled to one or more peripheral devices via a Workspace Managing Device (WMD) such as a dock, docking station, intelligent hub, external display, wireless KVM, or other IHS. Additionally, or alternatively, a client's IHS may be directly coupled to one or more peripheral devices using any suitable wireless communication protocol (e.g., BLUETOOTH or "BT," BLUETOOTH LOW ENERGY or "BLE," ZIGBEE, Z-WAVE, WI-FI, WI-FI DIRECT, etc.).

Whenever a workspace is used by a client, they typically spend a significant amount of time pairing wireless devices found in the workspace to their IHS, and/or pairing their own wireless devices to a workspace's IHS. For example, if a headset is provided as part of a hoteling workspace that is new to the client, the headset is also a new device with respect to the client's IHS, and the client must ordinarily manually configure/pair the workspace's headset to their IHS. Conversely, if an IHS is part of the hoteling workspace that is new to the client and the client brings his own headset to work, the client must ordinarily manually configure/pair their headset to the workspace's IHS. In some cases, a client must manually pair each peripheral device to a given IHS by going through one or more time-consuming Q&A challenges (e.g., entering pins or codes, multi-factor authentication, etc.).

Moreover, client IHSs in each workspace may have access to wireless network connectivity via a distinct AP or wireless router. Each AP may require a different AP or WiFi profile for a client IHS to be able to connect to it, for example, for security or Quality-of-Service (QoS) reasons. As used herein, an AP profile describes groups of settings that can defined, saved, and applied to an IHS for the IHS to connect to an AP. In some cases, AP profile may be provided in that form of a file usable to configure at least one of: AP operation parameters, radio settings, port operations, regulatory domain, pre-shared key (PSK), Simple Network Management Protocol (SNMP) information, etc. As such, a client must also ordinarily manually configure and connect to a workspace's AP upon arrival at the workspace.

Existing workspace management tools are not designed to handle the aforementioned scenarios. Using systems and methods described herein, however, peripheral devices may be pre-paired or pre-configured in response to reservation of a workspace and/or at some point prior to the client's arrival at the workspace, so that IHSs and peripheral devices are up and running seamlessly, for example, as soon as a workspace and/or a client IHS recognizes or is within reach of each other (e.g., by proximity, geolocation, connection to a dock, connection to an AP, etc.).

Figure 2:
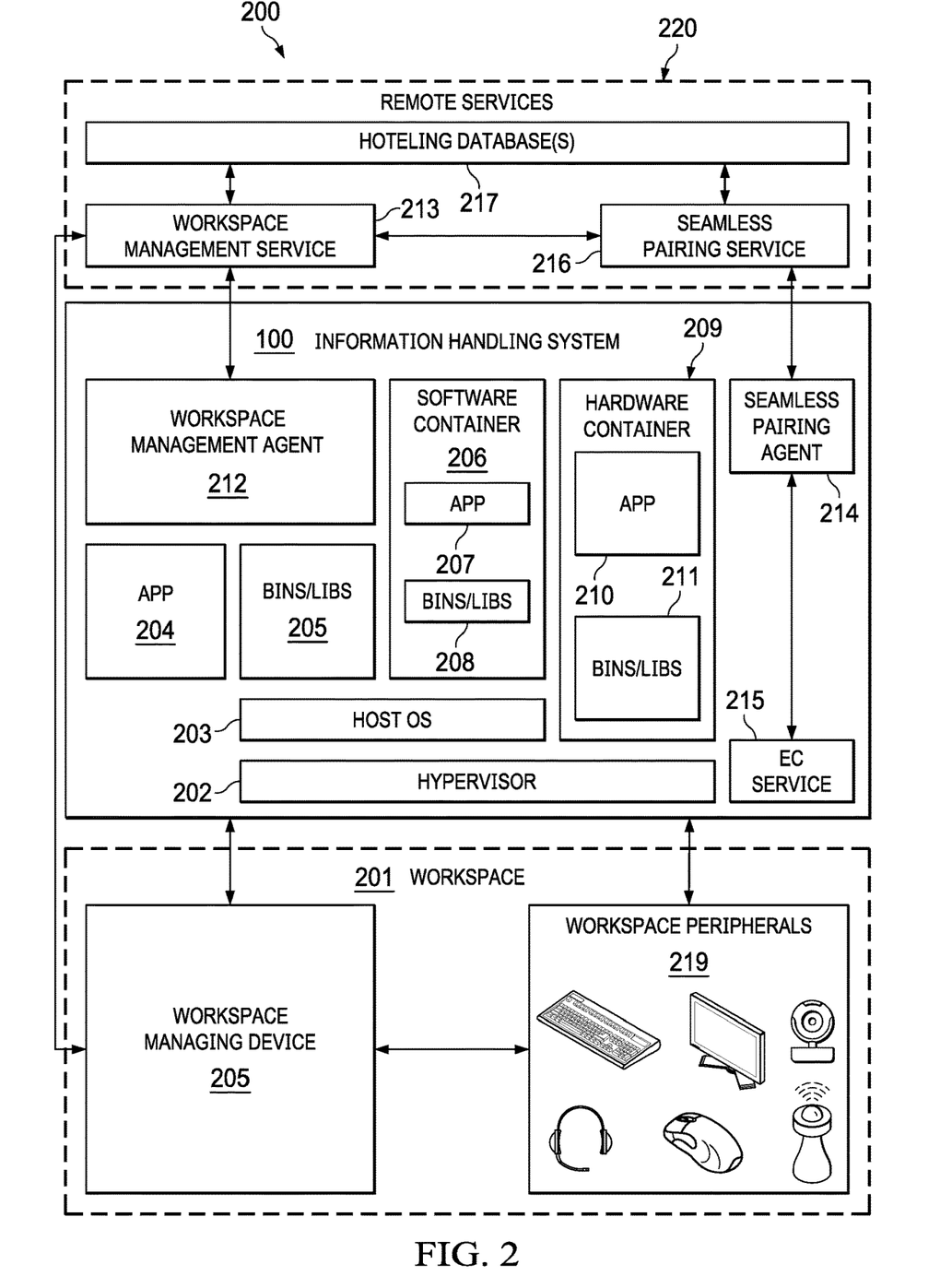
FIG. 2 is a diagram of an example of a system for seamless pairing of wireless devices in hoteling environments, according to some embodiments.

FIG. 2 is a diagram of an example of system 200 for seamless pairing of wireless devices in hoteling environments. In system 200, IHS 100 (e.g., a client IHS) executes hypervisor 202 shown as a type-1, native, or bare-metal hypervisor running directly on IHS 100 to manage host OS 203. In other implementations, however, hypervisor 202 may be a type-2 or hosted hypervisor running on top of host OS 203.

To produce and/or manage a first type of workload, hypervisor 202 may support host OS 203, which in turn enables native application 204 to execute using binary files and/or library files (bins/libs) 205. Additionally, or alternatively, to produce and/or manage a second type of workload, hypervisor 202 may instantiate software-based container 206 (e.g., a Virtual Machine (VM), docker, snap, Progressive Web App (PWA), Virtual Desktop Integration (VDI), etc.) through host OS 203, where application 207 executes using container bin/libs 208. Additionally, or alternatively, to produce and/or manage a third type of workload, hypervisor 202 further may instantiate hardware-based container 209 (e.g., Hyper-V, INTEL Clear Container, etc.) where application 210 executes using container bin/libs 211.

In some implementations, software-based container 206 may be configured to execute applications or workloads that do not require a high level of security, for example, because they are trusted, such as application 207. Conversely, hardware-based container 209 may be configured to execute applications or workloads that do require a high level of security, for example, because they are untrusted, such as application 210. Additionally, or alternatively, hardware-based container 209 may be configured to execute applications that require an OS different than host OS 203.

In some embodiments, when applications are distributed and/or deployed from a trusted source, software-based container 206 may be used as it generally has less overhead and provides higher containerized application density. Conversely, when applications are distributed and/or deployed from an untrusted source, hardware-based and/or hypervisor-isolated hardware-based container 209 may be used, despite presenting a higher overhead, to the extent it provides better isolation or security.

Software-based container 206 shares the kernel of host OS 203 and UEFI services, but access is restricted based upon the user's privileges. Hardware-based container 209 has a separate instance of OS and UEFI services. In both cases, containers 206 and 209 serve to isolate applications from host OS 203 and other applications.

In various embodiments, IHS 100 may also execute workspace management agent 212, which is configured to communicate with workspace management service 213 of remote services 220, for example, over the Internet. In some cases, workspace management service 213 may be configured with a workspace reservation or scheduling application through which workspace management agent 212 enables a client to reserve or schedule a workspace for later use. A client may use workspace management agent 212 (or a web browser) to access a Graphical User Interface (GUI) of the workspace management service 213's reservation or scheduling application or service, which may in turn be configured to display a list of available workspaces, as well as IHSs and/or peripherals located in each workspace.

For example, workspace management service 213 may maintain a first table (Table 1) in hoteling database 217 that lists details of each peripheral device available in each of workspaces A-N:

TABLE 1

| WORKSPACE | AVAILABLE PERIPHERAL DEVICES |
|---|---|
| Workspace A | Display[ ]:{S2722DC, Resolution: 2560 × 1440, Portrait}<br>Bluetooth Headset:{Dell WL-7022, DeviceID, OOB SmpTk [16 bytes]<br>Wireless AP: <cert><br>... |
| ... | ... |
| Workspace N | Display[ ]:{AW2721D, Resolution: 2560 × 1440, Landscape}<br>Bluetooth Headset:{Dell WL-5022, DeviceID, OOB SmpTk [16 bytes]<br>Wireless AP: <cert><br>... |

Workspace management service 213 may also maintain a second table (Table 2) in hoteling database 217 that lists reservation details of each of workspaces A-N, such as the date, time, and user identification for each existing reservation:

TABLE 2

| WORKSPACE | RESERVATION DETAILS |
|---|---|
| Workspace A | Reservation [ ]:<br>[08/03/21]<br>[0900-1300]: user1@XYZ.com<br>[1500-1800]: user2@XYZ.com<br>[08/04/21]<br>[1200-1400]: user3@XYZ.com |
| ... | ... |
| Workspace N | Reservation [ ]:<br>[null] // nobody reserved |

In some implementations, hoteling database 207 may include complete peripheral details (e.g., device, model number, firmware version, driver package, etc.) for every workspace A-N. Additionally, or alternatively, hoteling database 207 may include each workspace's wireless device certificates and keys. For APs serving each workspace, hoteling database 207 may also include an AP profile. In some cases, the contents of Tables 1 and/or 2 may be maintained as file(s) (e.g., JSON, etc.) in a format optimized for the specific database.

Still referring to FIG. 2, a given one of workspaces A-N is depicted as workspace 201. Particularly, in workspace 201, WMD 218 may include a dock, display, hub, IHS, etc. having wired (e.g., USB, Ethernet, etc.) or wireless (e.g., BLUETOOTH, WiFi, etc.) connections to a plurality of peripheral devices 219. In some cases, WMD 218 may also include (or be connected to) an AP or wireless router providing network connectivity to workspace 201. In other cases, WMD 218 may be absent from workspace 201.

In various embodiments, to enable the seamless pairing of wireless devices 219 in workspace 201 to a client's IHS 100 and/or the seamless pairing of a client's wireless device(s) to WMD 218 and/or a workspace IHS, IHS 100 may include seamless pairing agent 214 and EC service 215. Seamless pairing agent 214 may be executed by OS 203 distinctly from workspace management agent 212. Meanwhile, EC service 215 may be executed by EC 115 and it may be configured to perform or facilitate Out-of-Band (OOT) BT device LE pairing. Seamless pairing agent 214 is in communication with seamless pairing service 216 (e.g., a cloud service), and their operation is described in more detail with respect to FIG. 3.

Figure 3:
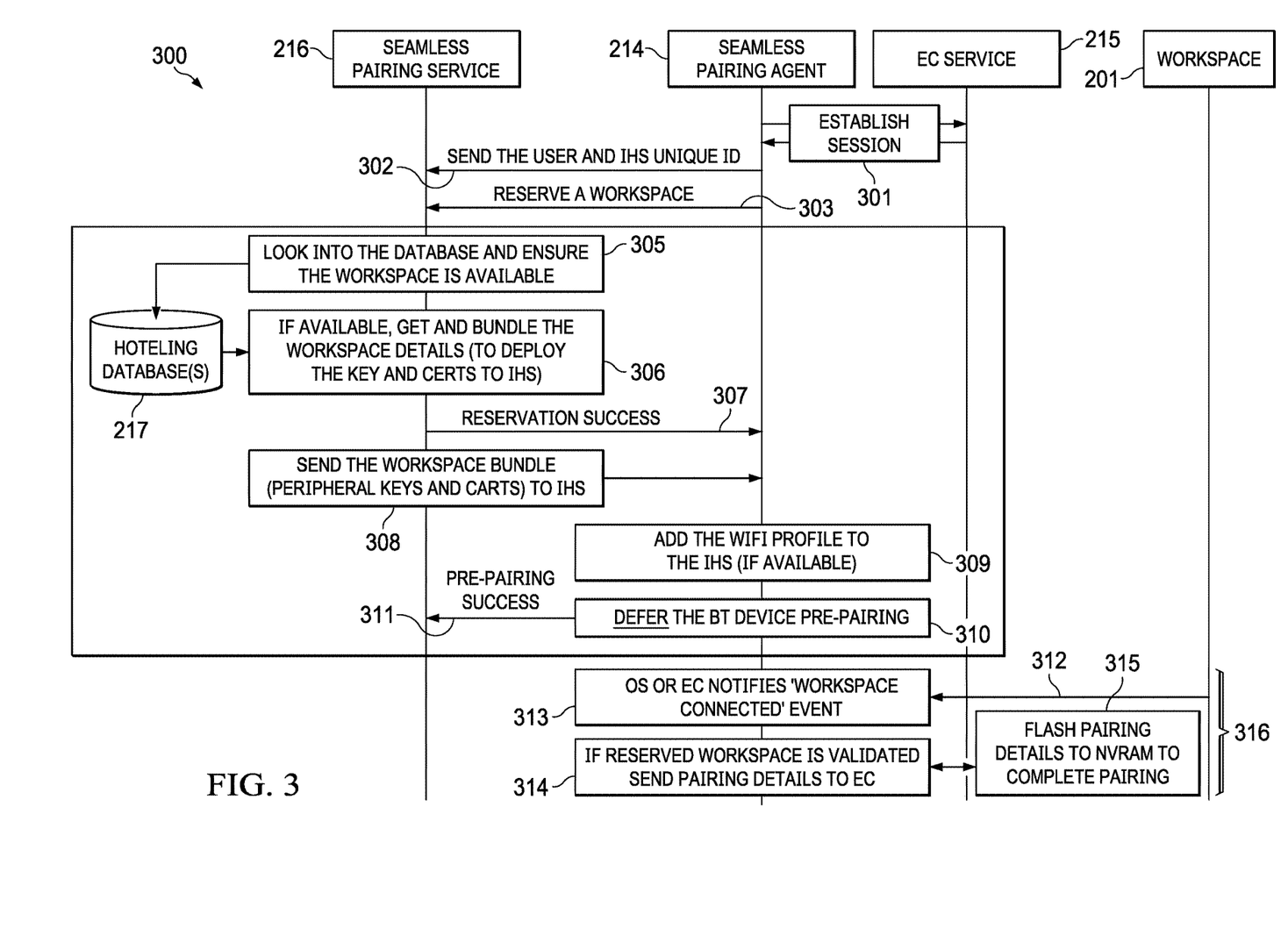
FIG. 3 is a diagram of an example of a method for seamless pairing of wireless devices in hoteling environments, according to some embodiments.

FIG. 3 is a diagram of an example of method 300 for seamless pairing of wireless devices 219 in hoteling workspace 201. In some embodiments, method 300 may be performed, at least in part, by seamless pairing service 216 and agent 214 in cooperation with hoteling database 217 and EC service 215, as shown in FIG. 2. Particularly, method 300 begins at 301 where, within IHS 100, seamless pairing agent 214 establishes a session with EC service 215.

Once the session is established at 301, seamless pairing agent 214 may receive contextual or triggering information from EC service 215, such as received or collected by sensor(s) 112 in FIG. 1 (e.g., geolocation, proximity, etc.). In some cases, EC service 215 may be configured to wake-up IHS 100 from a sleep or standby state into another power state sufficient for IHS 100 to complete the pairing of peripheral device(s) 219 upon arrival at workspace 201.

At 302, seamless pairing agent 214 sends client details (e.g., unique ID, username, email address, etc.) and IHS 100 details (e.g., service tag, System Management BIOS ID, Universally Unique Identifier or "UUID," Globally Unique Identifier or "GUID," etc.) to seamless pairing service 216. Then, at 303, seamless pairing agent 214 accepts input from the client to reserve a workspace via seamless pairing service 216, which may serve as an interface into workspace management service 213 and/or hoteling database 217 via any suitable Application Programming Interface (API).

At 304, a pre-pairing process is performed in connection with the workspace reservation. Specifically, at 305 seamless pairing service 216 checks with hoteling database 217 to ensure a workspace selected by the client is available at the desired date(s) and time(s). If so, at 306 hoteling database 217 gathers information about the selected workspace (e.g., from Tables 1 and 2), including data usable to pair/pre-pair peripheral device(s) 219 to IHS 100 (e.g., pairing data such as keys, certificates, profiles, etc.), updates reservation table(s), and sends the information to seamless pairing service 216.

In some cases, seamless pairing service 216 may filter hoteling database 217 to produce only pairing information for a subset of all available peripherals devices 219 that the client and/or IHS 100 is allowed to access (e.g., it may exclude a printer or projector), based upon the client's privileges and/or roles in an enterprise. The subset of peripherals devices 219 may be selected based, at least in part, upon context information, such as, for example, a class of the IHS, a service tag of the IHS, or an identity of the client, a type of container executed by the IHS, a posture of the IHS, etc.

At 307, seamless pairing service 216 informs seamless pairing agent 214 that the workspace reservation was successful. Then, at 308, seamless pairing service 216 sends an AP profile as well as device pairing data to seamless pairing agent 214. In some cases, if the client reserves a workspace sufficiently in advance (e.g., for the next day), seamless pairing service 216 may intelligently push the AP profile and other pairing data to seamless pairing agent 214 a selected number of hours before the reservation time. Additionally, or alternatively, seamless pairing service 216 may push the AP profile and other pairing data to seamless pairing agent 214 when IHS 100 is within a selected distance from workspace 201.

At 309, seamless pairing agent 214 adds the AP profile for the reserved workspace to a folder with Wi-Fi network profiles and/or executes a "netsh wlan add profile" command, or the like, to install the AP profile in IHS 100. Also, at 310, seamless pairing agent 214 pre-pairs devices 219, at least in part, by locally saving the pairing data such as device id, 16-byte OOB pairing key, etc. for a given device while abstaining from having EC 115 write at least a portion of the pairing data to a memory (e.g., NVRAM). At 311, seamless pairing agent 214 indicates to seamless pairing service 216 that pre-pairing process 304 has been successful.

Pre-pairing process 304 may be performed prior to the client's arrival at workspace 210 (e.g., from home, from a lobby, etc.). Additionally, or alternatively, pre-pairing process 304 may be performed by the client using a device other than IHS 100. In situations where the client brings his own peripheral device(s) to workspace 201 equipped with an enterprise IHS, for example, pre-pairing process 304 may be at least in part reversed. For example, the client may select their peripheral device(s) from a list and/or provide their pre-pairing information via a GUI. Then, the enterprise IHS at workspace 201 may pre-pair itself with the client's personal peripheral device(s) in anticipation of the scheduled session.

At 313, typically at a time closer to the scheduled reservation time, seamless pairing agent 214 receives signal 312 from workspace 201 that indicates to OS 203 or EC 115 that IHS 100 is sufficiently close or within range of workspace 201 and completes the paring of devices 219 and/or activation of AP profile as part of process 316. For example, signal 312 may be processed by IHS 100 to produce a Received Signal Strength Indicator (RSSI), a geolocation, a network address, a Quick Response (QR) code, a Radio-Frequency Identification (RFID) tag, etc., and to compare that information against a selected threshold or value. In some cases, signal 312 may be received as part of a communication from workspace management device 218.

At 314, if seamless pairing agent 214 determines that workspace 201 is the reserved workspace (e.g., by validating the with the workspace unique ID), it completes the pairing of devices, at least in part, by sending the device OOB pre-pairing details to EC service 215. Finally, at 315, EC service 215 writes the remaining pre-pairing data to appropriate NVRAM variable(s) to complete the pairing process for peripheral device(s) 219.

In some cases, seamless pairing service 216 may forward pre-pairing data to workspace management service 213, and workspace management service 213 may run a script to delegate a subset of operations 305-311 to workspace management agent 212, which may allow such pre-pairing data to be transferred from to IHS 100 using established ITDM secure channels.

By using method 300, the impact of pairing peripheral devices and/or connecting to a relevant AP as part of starting up workspace 201 is reduced to the operations of process 316, which is effectively seamless from the client's perspective. Method 300 enables IHS 100 to the seamlessly pair with the wireless AP (using an imported AP profile) and/or peripheral devices (via BTLE pre-pairing) without requiring manual effort on the part of the client, thus significantly reducing the lead time to use a workspace.

As such, systems and methods described herein may provide zero-touch enablement of wireless devices in the hoteling workspace for the client, reducing the lead time to use the workspace after docking. These systems and methods may contextually connect with the hoteling reservation workflow to provide the ability to seamless quickly pair IHS 100 and peripheral device(s) 219 in a reserved workspace 201.

It should be understood that various operations described herein may be implemented in software executed by processing circuitry, hardware, or a combination thereof. The order in which each operation of a given method is performed may be changed, and various operations may be added, reordered, combined, omitted, modified, etc. It is intended that the invention(s) described herein embrace all such modifications and changes and, accordingly, the above description should be regarded in an illustrative rather than a restrictive sense.

The terms "tangible" and "non-transitory," as used herein, are intended to describe a computer-readable storage medium (or "memory") excluding propagating electromagnetic signals; but are not intended to otherwise limit the type of physical computer-readable storage device that is encompassed by the phrase computer-readable medium or memory. For instance, the terms "non-transitory computer readable medium" or "tangible memory" are intended to encompass types of storage devices that do not necessarily store information permanently, including, for example, RAM. Program instructions and data stored on a tangible computer-accessible storage medium in non-transitory form may afterwards be transmitted by transmission media or signals such as electrical, electromagnetic, or digital signals, which may be conveyed via a communication medium such as a network and/or a wireless link.

Unless stated otherwise, terms such as "first" and "second" are used to arbitrarily distinguish between the elements such terms describe. Thus, these terms are not necessarily intended to indicate temporal or other prioritization of such elements. The terms "coupled" or "operably coupled" are defined as connected, although not necessarily directly, and not necessarily mechanically. The terms "a" and "an" are defined as one or more unless stated otherwise. The terms "comprise" (and any form of comprise, such as "comprises" and "comprising"), "have" (and any form of have, such as "has" and "having"), "include" (and any form of include, such as "includes" and "including") and "contain" (and any form of contain, such as "contains" and "containing") are open-ended linking verbs. As a result, a system, device, or apparatus that "comprises," "has," "includes" or "contains" one or more elements possesses those one or more elements but is not limited to possessing only those one or more elements. Similarly, a method or process that "comprises," "has," "includes" or "contains" one or more operations possesses those one or more operations but is not limited to possessing only those one or more operations.

Although the invention(s) is/are described herein with reference to specific embodiments, various modifications and changes can be made without departing from the scope of the present invention(s), as set forth in the claims below. Accordingly, the specification and figures are to be regarded in an illustrative rather than a restrictive sense, and all such modifications are intended to be included within the scope of the present invention(s). Any benefits, advantages, or solutions to problems that are described herein with regard to specific embodiments are not intended to be construed as a critical, required, or essential feature or element of any or all the claims.

The invention claimed is:

1. An Information Handling System (IHS), comprising:
a processor; and
a memory coupled to the processor, the memory having program instructions stored thereon that, upon execution, cause the IHS to:
in response to a temporary reservation of one of a plurality of workspaces, receive data associated with a peripheral device located in the workspace;
pre-pair the peripheral device to the IHS based upon the data in anticipation of the IHS having reached the workspace; and
in response to a determination that the IHS has reached the workspace, complete a pairing of the peripheral device to the IHS.

2. The IHS of claim 1, wherein the data comprises at least one of: a device identifier, a pairing key, or a certificate.

3. The IHS of claim 1, wherein the peripheral device comprises at least one of: a display, a headset, a keyboard, a mouse, a webcam, or a printer.

4. The IHS of claim 1, wherein the data associated with the peripheral device is received from a hoteling database comprising a reservation table and a peripheral table for the plurality of workspaces.

5. The IHS of claim 1, wherein to pre-pair the peripheral device, the program instructions, upon execution, further cause the IHS to abstain from flashing at least a portion of the data to a Non-Volatile Random-Access Memory (NVRAM).

6. The IHS of claim 5, wherein to complete the pairing, the program instructions, upon execution, further cause the IHS to flash the portion of the data to the NVRAM.

7. The IHS of claim 1, wherein the determination is made by an Embedded Controller (EC) controller coupled to the processor while the IHS is in a low-power mode of operation.

8. The IHS of claim 7, wherein the determination is based, at least in part, upon at least one of: a Received Signal Strength Indicator (RSSI), a geolocation, a network address, a Quick Response (QR) code, or a Radio-Frequency Identification (RFID) tag.

9. The IHS of claim 7, wherein the program instructions, upon execution, further cause the IHS to determine that the IHS has reached the workspace, at least in part, in response to a communication from a workspace management device.

10. The IHS of claim 1, wherein the peripheral device is selected among a plurality of peripheral devices located in the workspace based, at least in part, upon context information.

11. The IHS of claim 10, wherein the context information comprises at least one of: a class of the IHS, a service tag of the IHS, or an identity of a user of the IHS.

12. The IHS of claim 10, wherein the context information comprises a type of container executed by the client IHS.

13. The IHS of claim 10, wherein the context information comprises a posture of the IHS.

14. The IHS of claim 1, wherein the program instructions, upon execution, further cause the IHS to:
in response to the temporary reservation, receive an Access Point (AP) profile associated with an AP configured to serve the workspace; and
in response to the determination, connect to the AP based upon the AP profile.

15. A memory storage device having program instructions stored thereon that, upon execution by an Information Handling System (IHS), cause the IHS to:

identify pairing data associated with a peripheral device located in one of a plurality of workspaces scheduled for hoteling by a user; and transmit the pairing data to a client device operated by the user, wherein the client device is at a location exclusive of the scheduled workspace, and wherein the client device is configured to: pre-pair the peripheral device based upon the pairing data and, in response to a determination that the client device has reached the scheduled workspace, complete a pairing of the peripheral device.

16. The memory storage device of claim 15, wherein the pairing data comprises at least one of: a device identifier, a pairing key, or a certificate, and wherein the peripheral device comprises at least one of: a display, a headset, a keyboard, a mouse, a webcam, or a printer.

17. The memory storage device of claim 15, wherein the program instructions, upon execution, further cause the IHS to transmit, to the client device, an Access Point (AP) profile associated with an AP configured to serve the scheduled workspace, and wherein the client device is configured to connect to the AP based upon the AP profile.

18. A method, comprising:
scheduling use of a workspace by a client, wherein the workspace comprises an Information Handling System (IHS); and transmitting, to the IHS, data associated with a device kept by the client, wherein the IHS is configured to: (a) pre-pair the device based upon the data in anticipation of the client arriving at the workspace; and (b) complete a pairing of the device in response to the client arriving at the workspace.

19. The method of claim 18, wherein the pairing data comprises at least one of: a device identifier, a pairing key, or a certificate.

20. The method of claim 18, wherein the device comprises at least one of: a display, a headset, a keyboard, a mouse, a webcam, or a printer.

* * * * *